(12) United States Patent  (10) Patent No.: US 7,541,410 B2
Horie et al.  (45) Date of Patent: Jun. 2, 2009

(54) THERMOSETTING RESIN COMPOSITION, THERMOSETTING RESIN MOLDING COMPOUND AND CURED PRODUCT THEREOF

(75) Inventors: Masayasu Horie, Tokyo (JP); Yukio Tokunaga, Tokyo (JP); Shigeyoshi Furuhara, Tokyo (JP)

(73) Assignee: Sumitomo Bakelite Co., Ltd., Tokyo (JP)

( * ) Notice: Subject to any disclaimer, the term of this patent is extended or adjusted under 35 U.S.C. 154(b) by 0 days.

(21) Appl. No.: 11/722,957

(22) PCT Filed: Sep. 30, 2005

(86) PCT No.: PCT/JP2005/018124

§ 371 (c)(1),
(2), (4) Date: Jun. 27, 2007

(87) PCT Pub. No.: WO2006/070519

PCT Pub. Date: Jul. 6, 2006

(65) Prior Publication Data

US 2008/0139757 A1  Jun. 12, 2008

(30) Foreign Application Priority Data

Dec. 27, 2004 (JP) ............................. 2004-378191
Mar. 29, 2005 (JP) ............................. 2005-096500

(51) Int. Cl.
C08F 283/06 (2006.01)
C08L 61/10 (2006.01)

(52) U.S. Cl. .................. 525/501; 525/491; 525/505
(58) Field of Classification Search ............... 525/505
See application file for complete search history.

(56) References Cited

U.S. PATENT DOCUMENTS

| 4,167,500 A |   | 9/1979 | Jazenski et al. |        |
|-------------|---|--------|-----------------|--------|
| 4,904,753 A | * | 2/1990 | Watts et al.    | 528/137 |
| 4,942,217 A | * | 7/1990 | Gardziella et al. | 528/129 |
| 5,243,015 A | * | 9/1993 | Hutchings et al. | 528/129 |

FOREIGN PATENT DOCUMENTS

| JP | 53-13647 | 2/1978 |
|----|----------|--------|
| JP | 56-18641 | 2/1981 |
| JP | 4-70381 | 3/1992 |
| JP | 4-219283 | 8/1992 |
| JP | 6-255263 | 9/1994 |
| JP | 8-302158 | 11/1996 |
| JP | 11-209563 | 8/1999 |
| JP | 2000-310852 | 11/2000 |
| JP | 2004-269856 | 9/2004 |
| WO | PCT/JP2005/018124 | 11/2005 |

OTHER PUBLICATIONS

Paula Yurkana Bruice. Organic Chemistry. 3rd Edition. pp. 638-639. Prentice-Hall, Inc. Upper Saddle River, NJ: 2001.*
Machine Translation of Tokunaga et al. JP 2004-269856 A.*
Machine Translation of Endo et al. JP 06-255263 A.*
Machine Translation of Kunida et al. JP 2000-310852.*

* cited by examiner

*Primary Examiner*—Randy Gulakowski
*Assistant Examiner*—Michael Dollinger
(74) *Attorney, Agent, or Firm*—Ditthavong Mori & Steiner, P.C.

(57) ABSTRACT

A thermosetting resin composition comprising a novolac-type phenolic resin, a polyacetal resin and a cyclohexyl compound represented by the general formula (1) as a curing catalyst, a thermosetting resin molding compound comprising the thermosetting resin composition and a filler, and a cured product formed by curing the thermosetting resin composition or the thermosetting resin molding compound are provided.

[Chemical formula 1]

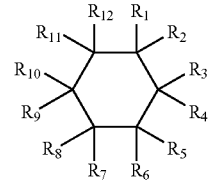

(1)

In the formula, $R_1$ to $R_{12}$ are defined in the claims and description.

14 Claims, No Drawings

THERMOSETTING RESIN COMPOSITION, THERMOSETTING RESIN MOLDING COMPOUND AND CURED PRODUCT THEREOF

TECHNICAL FIELD

The present invention relates to a thermosetting resin composition, a thermosetting resin molding compound and a cured product thereof.

BACKGROUND ART

Phenolic resins include 1) thermoplastic novolac-type phenolic resins and 2) thermosetting resole resins. Novolac-type phenolic resins are used as a thermosetting phenolic resin composition by containing a curing agent (in most cases hexamethylenetetramine is used as a curing agent). They have various excellent properties such as heat resistance, mechanical strength, electrical properties and so on, and are used for various applications such as molding compounds, laminated sheets, adhesives and so on.

In contrast, due to the low temperature dependence of the curing rate, conventional thermosetting phenolic resin compositions have a problem as follows. In a molding method such as injection molding for example, if a resin composition having a fast curing rate at the molding temperature is used for molding in order to reduce production time in a molding process, curing of the melted resin is promoted at a temperature lower than the molding temperature when melting the resin composition. Consequently, thermal stability of the resin deteriorates and it causes a problem that the range of conditions required for molding is strictly limited so as to impair molding workability. On the other hand, in view of thermal stability of resin, if a resin composition having a low curing rate at a temperature lower than the molding temperature at which the resin composition is melted is used, the curing rate at the molding temperature also decreases so as to reduce productivity. Thus, a thermosetting resin composition which is well balanced between productivity and molding workability, has a fast curing rate at the molding temperature, enables to reduce production time, and is stable without curing at a temperature lower than the molding temperature at which the resin composition is melted has been strongly desired.

In such a resin composition, in order to increase the curing rate of such a thermosetting phenolic resin composition, a high molecular novolac-type phenolic resin (e.g. pages 2 to 4 of Japanese Patent Application laid-open (JP-A) No. 2001-40177) or a high ortho novolac-type phenolic resin (e.g. pages 2 to 3 of JP-A No. Hei. 8-302158) has been used hitherto; however, effects thereof are insufficient.

Adding an organic acid as a decomposition accelerator of hexamethylenetetramine, which is used as a curing agent, has been proposed as a method to increase the curing rate; however, effects thereof are also insufficient.

DISCLOSURE OF INVENTION

Problems to be Solved by the Invention

The present invention is to provide a thermosetting resin composition which is excellent in thermal stability and has an extremely fast curing rate, a thermosetting resin molding compound obtained therefrom and a cured product thereof.

Means for Solving the Problems

The inventors of the present invention found out that the thermal curing rate of a resin composition containing a novolac-type phenolic resin and a polyacetal resin is extremely increased by making the polyacetal resin function as a curing agent of the novolac-type phenolic resin and using a cyclohexyl compound as a curing catalyst. As a result of conducting further diligent researches, the present invention was finally obtained.

The present invention is a thermosetting resin composition comprising a novolac-type phenolic resin, a polyacetal resin and a curing catalyst represented by the general formula (1).

[Chemical formula 1]

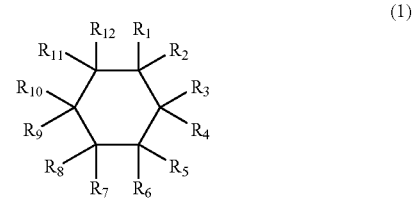

(1)

In this formula, $R_1$ to $R_{12}$ each denote any of a hydrogen, an alkyl group having 1 to 4 carbon atoms, a hydroxyl group and a group represented by the following formula (2) to (4). One or two or more of $R_1$ to $R_{12}$ are a group represented by the formula (2), (3) or (4) and may be the same or different from each other.

[Chemical formula 2]

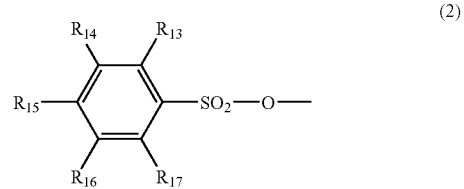

(2)

In this formula, $R_{13}$ to $R_{17}$ each denote any of a hydrogen, an alkyl group having 1 to 4 carbon atoms, a hydroxyl group, an alkoxy group, a halogen, a nitro group, a nitroso group, a sulfonic group, a carboxyl group, a cyano group, an amino group, an ammonio group, a trialkylammonio group and a group represented by the following formula (5) or (6).

[Chemical formula 3]

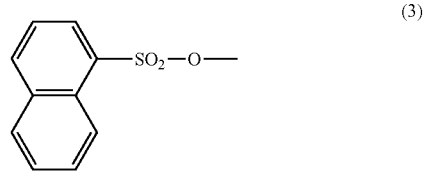

(3)

[Chemical formula 4]

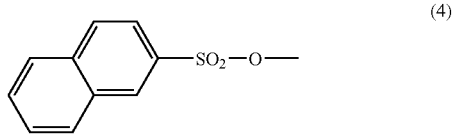

(4)

[Chemical formula 5]

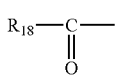
(5)

In this formula, $R_{18}$ denotes a hydrogen or an alkyl group having 1 to 4 carbon atoms.

[Chemical formula 6]

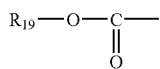
(6)

In this formula, $R_{19}$ denotes a hydrogen or an alkyl group having 1 to 4 carbon atoms.

In the thermosetting resin composition, from the viewpoint of preventing curing at low temperature, the curing catalyst preferably has two or more groups represented by the formula (2), (3) or (4) as $R_1$ to $R_{12}$ of the general formula (1).

In the thermosetting resin composition, from the viewpoint of increasing the curing rate, the curing catalyst is preferably a compound represented by the general formula (1) having a group represented by the formula (2), (3) or (4) as $R_1$ and $R_3$, a compound represented by the general formula (1) having a group represented by the formula (2), (3) or (4) as $R_1$ and $R_5$, a compound represented by the general formula (1) having a group represented by the formula (2), (3) or (4) as $R_1$ and $R_7$ or a compound represented by the general formula (1) having a group represented by the formula (2), (3) or (4) as $R_1$, $R_5$ and $R_9$.

In the thermosetting resin composition, from the viewpoint of increasing the curing rate further, the group represented by the formula (2) is preferably a group represented by the following formula (7).

[Chemical formula 7]

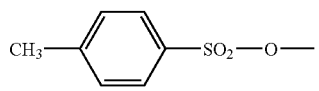
(7)

In the thermosetting resin composition, from the viewpoint of increasing the curing rate most highly, the curing catalyst represented by the general formula (1) is 1,2-bis(p-toluenesulfonic acid)cyclohexyl, 1,3-bis(p-toluenesulfonic acid)cyclohexyl, 1,4-bis(p-toluenesulfonic acid)cyclohexyl or 1,3,5-tris(p-toluenesulfonic acid)cyclohexyl.

The thermosetting resin composition preferably contains 10 to 30 parts by weight of the polyacetal resin with respect to 100 parts by weight of the novolac-type phenolic resin.

In the thermosetting resin composition, from the viewpoint of increasing the curing rate most highly, the novolac-type phenolic resin is preferably a novolac-type phenol-formaldehyde resin obtained by reacting phenols with formaldehydes.

In the thermosetting resin composition, the novolac-type phenolic resin preferably has an electrical conductivity of aqueous extract of 50 μS/cm or less.

The present invention also represents a thermosetting resin molding compound comprising the thermosetting resin composition and a filler.

The present invention also further represents a cured product formed by curing the thermosetting resin composition or the thermosetting resin molding compound.

Effect of the Invention

According to the present invention, a thermosetting resin composition having an extremely fast curing rate can be obtained. It is suitably used for applications such as molding compounds, laminated sheets, adhesives and so on, for which a thermosetting phenolic resin composition has conventionally been employed. Further, a cured product obtained therefrom is suitable for applications such as automobile parts, electromechanical parts, electric and electronic parts, and so on.

BEST MODE FOR CARRYING OUT THE INVENTION

Hereinafter, the best mode for carrying out the thermosetting resin composition, the thermosetting resin molding compound and the cured product thereof of the present invention will be described in detail.

In one aspect, the present invention relates to a thermosetting resin composition comprising a novolac-type phenolic resin, a polyacetal resin and a curing catalyst represented by the general formula (1) and a thermosetting resin composition having an extremely fast curing rate may be obtained by comprising such components. The present invention also relates to a thermosetting resin molding compound comprising such a thermosetting resin composition and a filler in one aspect. The present invention also further relates to a cured product obtained by curing such a thermosetting resin composition or a thermosetting resin molding compound in one aspect.

The novolac-type phenolic resin used for the present invention is obtained by allowing phenols to react with formaldehydes in or without the presence of catalyst, and they may be either random novolac-type or high ortho novolac-type. For increasing the curing rate of such resins, it is preferable to use phenol, cresol, xylenol, naphthol or the like as phenol and to use formaldehyde, paraformaldehyde or the like as aldehyde. For increasing the curing rate most highly, a novolac-type phenol-formaldehyde resin obtained by allowing phenol as phenols to react with formaldehyde as aldehydes is most preferable.

In the novolac-type phenolic resin, it is preferable that the content of ionic impurities is smaller. When the content of ionic impurities is represented by the electrical conductivity of aqueous extract, a novolac-type phenolic resin having an electrical conductivity of aqueous extract of 50 μS/cm or less is preferable. It is more preferable that the value of the electrical conductivity of aqueous extract gets closer to zero. If the value is in the aforementioned range, the resin exhibits more excellent curability in the production of a curing product thereof.

As the measuring method of the electrical conductivity of aqueous extract used in the present invention, there may be a method such that a pressure-resistant container charged with 6.0 g of a novolac-type phenolic resin and 40 ml of distilled water is kept airtight, subject to heat treatment in an oven at 125° C. for 20 hours, and left to cool, followed by measuring supernatant water thus obtained with an electrical conductivity meter.

The polyacetal resin used in the present invention may be a polymer which has an oxymethylene group as a main constituent unit and functions as a curing agent in the present invention. For example, there may be a homopolymer-type polyacetal resin, a copolymer-type polyacetal resin containing a constituent unit other than an oxymethylene group by less than 50% by weight. The polyacetal resin may contain additives such as a release agent, an oxidation inhibitor and so on. As the homopolymer polyacetal resin, for example, there may be Delrin 500 NC010 (manufactured by DuPont), Tenac 4010 (manufactured by Asahi Kasei Corporation) or the like. As the copolymer polyacetal resin, there may be Duracon M90S (manufactured by Polyplastics Co., Ltd.), F30-01 (manufactured by Mitsubishi Engineering-Plastics Corporation), Tenac-C 7520 (manufactured by Asahi Kasei Corporation) or the like.

The curing catalyst represented by the general formula (1) used in the present invention may be one having a group represented by the formula (2), (3) or (4) as one or two or more of $R_1$ to $R_{12}$ of the general formula (1). The curing catalyst is preferably a compound represented by the general formula (1) having a group represented by the formula (2), (3) or (4) as $R_1$ and $R_3$, a compound represented by the general formula (1) having a group represented by the formula (2), (3) or (4) as $R_1$ and $R_5$, a compound represented by the general formula (1) having a group represented by the formula (2), (3) or (4) as $R_1$ and $R_7$, or a compound represented by the general formula (1) having a group represented by the formula (2), (3) or (4) as $R_1$, $R_5$ and $R_9$. $R_1$ and $R_3$, $R_1$ and $R_5$, or $R_1$, $R_5$ and $R_9$ of these compounds may be the same or different groups. As an alkyl group having 1 to 4 carbon atoms as $R_1$ to $R_{12}$ of the general formula (1), there may be listed a methyl group, an ethyl group, an n-propyl group, an iso-propyl group, an n-butyl group, a tert-butyl group and so on. As an alkyl group having 1 to 4 carbon atoms as $R_{13}$ to $R_{17}$ of the general formula (2), there may be listed a methyl group, an ethyl group, an n-propyl group, an iso-propyl group, an n-butyl group, a tert-butyl group and so on. As an alkoxy group, there may be listed a methoxy group, an ethoxy group and so on. As halogen, there may be listed fluorine, chlorine, bromine, iodine and so on. As a trialkylammonio group, there may be listed a trimethylammonio group and so on. As an alkyl group having 1 to 4 carbon atoms as $R_{18}$ of the general formula (5), there may be listed a methyl group, an ethyl group, an n-propyl group, an iso-propyl group, an n-butyl group, a tert-butyl group and so on. As an alkyl group having 1 to 4 carbon atoms as $R_{19}$ of the general formula (6), there may be listed a methyl group, an ethyl group, an n-propyl group, an iso-propyl group, an n-butyl group, a tert-butyl group and so on. Further, as a group represented by the general formula (2), a group having a methyl group as $R_{15}$ and hydrogen as $R_{13}$, $R_{14}$, $R_{16}$ and $R_{17}$ is preferable.

As specific examples of the curing catalysts, there may be listed: bis(p-toluenesulfonic acid) cyclohexyl such as 1,1-bis(p-toluenesulfonic acid)cyclohexyl, 1,2-bis(p-toluenesulfonic acid)cyclohexyl, 1,3-bis(p-toluenesulfonic acid)cyclohexyl, and 1,4-bis(p-toluenesulfonic acid)cyclohexyl; tris(p-toluenesulfonic acid)cyclohexyl such as 1,1,4-tris(p-toluenesulfonic acid)cyclohexyl, 1,2,3-tris(p-toluenesulfonic acid)cyclohexyl, 1,2,4-tris(p-toluenesulfonic acid)cyclohexyl, and 1,3,5-tris(p-toluenesulfonic acid)cyclohexyl; tetrakis(p-toluenesulfonic acid)cyclohexyl such as 1,1,4,4-tetrakis(p-toluenesulfonic acid)cyclohexyl, 1,2,3,4-tetrakis(p-toluenesulfonic acid)cyclohexyl, and 1,2,4,5-tetrakis(p-toluenesulfonic acid)cyclohexyl; penta(p-toluenesulfonic acid)cyclohexyl such as 1,1,3,3,5-penta(p-toluenesulfonic acid)cyclohexyl, 1,2,2,3,5-penta(p-toluenesulfonic acid)cyclohexyl, and 1,2,3,4,5-penta(p-toluenesulfonic acid)cyclohexyl; hexa(p-toluenesulfonic acid)cyclohexyl such as 1,1,3,3,5,5-hexa(p-toluenesulfonic acid)cyclohexyl, 1,1,2,4,4,5-hexa(p-toluenesulfonic acid)cyclohexyl, 1,1,2,3,4,5-hexa(p-toluenesulfonic acid)cyclohexyl, 1,2,3,3,4,5-hexa(p-toluenesulfonic acid)cyclohexyl, and 1,2,3,4,5,6-hexa(p-toluenesulfonic acid)cyclohexyl; hepta(p-toluenesulfonic acid)cyclohexyl such as 1,1,2,2,4,4,5-hepta(p-toluenesulfonic acid)cyclohexyl, 1,1,2,3,4,5,5-hepta(p-toluenesulfonic acid)cyclohexyl, 1,1,2,3,4,4,5-hepta(p-toluenesulfonic acid)cyclohexyl, and 1,1,2,3,4,5,6-hepta(p-toluenesulfonic acid)cyclohexyl; octa(p-toluenesulfonic acid)cyclohexyl such as 1,1,2,2,4,4,5,5-octa(p-toluenesulfonic acid)cyclohexyl, 1,1,2,2,3,4,5,6-octa(p-toluenesulfonic acid)cyclohexyl, 1,1,2,3,3,4,5,6-octa(p-toluenesulfonic acid)cyclohexyl, and 1,1,2,3,4,4,5,6-octa(p-toluenesulfonic acid)cyclohexyl; nona(p-toluenesulfonic acid)cyclohexyl such as 1,1,2,2,3,4,4,5,5-nona(p-toluenesulfonic acid)cyclohexyl, 1,1,2,2,3,4,4,5,6-nona(p-toluenesulfonic acid)cyclohexyl, and 1,1,2,3,3,4,5,5,6-nona(p-toluenesulfonic acid)cyclohexyl; deca(p-toluenesulfonic acid)cyclohexyl such as 1,1,2,2,3,3,4,4,5,5-deca(p-toluenesulfonic acid)cyclohexyl, and 1,1,2,2,3,4,4,5,5,6-deca(p-toluenesulfonic acid)cyclohexyl; 1,1,2,2,3,3,4,4,5,5,6-undeca(p-toluenesulfonic acid)cyclohexyl; 1,1,2,2,3,3,4,4,5,5,6,6-dodeca(p-toluenesulfonic acid)cyclohexyl and so on. Further, as one having a substituent thereof, there may be listed: bis(p-toluenesulfonic acid)cyclohexyl having a methyl group such as 1-methyl-2,2-bis(p-toluenesulfonic acid)cyclohexyl, 1-methyl-3,3-bis(p-toluenesulfonic acid)cyclohexyl, 1-methyl-4,4-bis(p-toluenesulfonic acid)cyclohexyl, 1-methyl-1,2-bis(p-toluenesulfonic acid)cyclohexyl, 1-methyl-2,3-bis(p-toluenesulfonic acid)cyclohexyl, 1-methyl-3,4-bis(p-toluenesulfonic acid)cyclohexyl, 1-methyl-2,4-bis(p-toluenesulfonic acid)cyclohexyl, 1-methyl-2,6-bis(p-toluenesulfonic acid)cyclohexyl, 1-methyl-3,5-bis(p-toluenesulfonic acid)cyclohexyl, 1-methyl-1,4-bis(p-toluenesulfonic acid)cyclohexyl, and 1-methyl-2,5-bis(p-toluenesulfonic acid)cyclohexyl; tris(p-toluenesulfonic acid)cyclohexyl having a methyl group such as 1-methyl-1,4,4-tris(p-toluenesulfonic acid)cyclohexyl, 1-methyl-2,2,5-tris(p-toluenesulfonic acid)cyclohexyl, 1-methyl-1,2,3-tris(p-toluenesulfonic acid)cyclohexyl, 1-methyl-1,2,6-tris(p-toluenesulfonic acid)cyclohexyl, 1-methyl-2,3,4-tris(p-toluenesulfonic acid)cyclohexyl, 1-methyl-3,4,5-tris(p-toluenesulfonic acid)cyclohexyl, 1-methyl-1,2,4-tris(p-toluenesulfonic acid)cyclohexyl, 1-methyl-1,2,5-tris(p-toluenesulfonic acid)cyclohexyl, 1-methyl-1,3,4-tris(p-toluenesulfonic acid)cyclohexyl, 1-methyl-2,3,6-tris(p-toluenesulfonic acid)cyclohexyl, 1-methyl-2,3,5-tris(p-toluenesulfonic acid)cyclohexyl, 1-methyl-2,4,5-tris(p-toluenesulfonic acid)cyclohexyl, 1-methyl-1,3,5-tris(p-toluenesulfonic acid)cyclohexyl, and 1-methyl-2,4,6-tris(p-toluenesulfonic acid)cyclohexyl; tetrakis(p-toluenesulfonic acid)cyclohexyl having a methyl group such as 1-methyl-2,2,5,5-tetrakis(p-toluenesulfonic acid)cyclohexyl, 1-methyl-1,2,3,4-tetrakis(p-toluenesulfonic acid)cyclohexyl, 1-methyl-1,2,3,6-tetrakis(p-toluenesulfonic acid)cyclohexyl, 1-methyl-2,3,4,5-tetrakis(p-toluenesulfonic acid)cyclohexyl, 1-methyl-1,2,4,5-tetrakis(p-toluenesulfonic acid)cyclohexyl, and 1-methyl-2,3,5,6-tetrakis(p-toluenesulfonic acid)cyclohexyl; penta(p-toluenesulfonic acid)cyclohexyl having a methyl group such as 1-methyl-1,3,3,5,5-penta(p-toluenesulfonic acid)cyclohexyl, 1-methyl-2,2,4,6,6-penta(p-toluenesulfonic acid)cyclohexyl, 1-methyl-2,2,4,4,6-penta(p-toluenesulfonic acid)cyclohexyl, 1-methyl-1,2,2,3,5-penta(p-toluenesulfonic acid)cyclohexyl, 1-methyl-2,3,3,4,6-penta(p-toluenesulfonic acid)cyclohexyl, 1-methyl-1,3,4,4,5-penta(p-toluenesulfonic acid)cyclohexyl, 1-methyl-1,2,3,4,5-penta(p-toluenesulfonic acid)cyclohexyl, 1-methyl-2,3,4,5-penta(p-toluenesulfonic acid)cyclohexyl, 1-methyl- 1,2,3,4,6-penta(p-toluenesulfonic acid)cyclohexyl, 1-methyl-1,2,3,5,6-penta(p-toluenesulfonic acid)cyclohexyl, and 1-methyl-2,3,4,5,6-penta(p-toluenesulfonic acid)cyclohexyl; hexa(p-toluenesulfonic acid)cyclohexyl having a methyl group such as 1-methyl-2,2,4,4,6,6-hexa(p-toluenesulfonic acid)cyclohexyl, 1-methyl-1,2,2,4,5,5-hexa(p-toluenesulfonic acid)cyclohexyl, 1-methyl-2,2,3,5,5,6-hexa(p-toluenesulfonic acid)cyclohexyl, 1-methyl-1,2,2,4,5,6-hexa(p-toluenesulfonic acid)cyclohexyl, 1-methyl-1,2,3,3,5,6-hexa(p-toluenesulfonic acid)cyclohexyl, 1-methyl-1,2,3,4,4,6-hexa(p-toluenesulfonic acid)cyclohexyl, 1-methyl-1,2,3,4,5,5-hexa(p-toluenesulfonic acid)cyclohexyl, 1-methyl-2,2,3,4,5,6-hexa(p-toluenesulfonic acid)cyclohexyl, 1-methyl-1,2,3,3,4,5-hexa(p-toluenesulfonic acid)cyclohexyl, 1-methyl-1,2,2,3,4,6-hexa(p-toluenesulfonic acid)cyclohexyl, 1-methyl-2,3,4,4,5,6-hexa(p-toluenesulfonic acid)cyclohexyl, and 1-methyl-1,2,3,4,5,6-hexa(p-toluenesulfonic acid) cyclohexyl; hepta(p-toluenesulfonic acid) cyclohexyl having a methyl group such as 1-methyl-2,2,3,3,5,6,6-hepta(p-toluenesulfonic acid)cyclohexyl, 1-methyl-1,2,2,4,4,5,5-hepta(p-toluenesulfonic acid)cyclohexyl, 1-methyl-2,2,3,3,5,5,6-hepta(p-toluenesulfonic acid)cyclohexyl, 1-methyl-1,2,2,4,4,5,6-hepta(p-toluenesulfonic acid)cyclohexyl, 1-methyl-1,2,3,3,5,5,6-hepta(p-toluenesulfonic acid)cyclohexyl, 1-methyl-2,2,3,4,5,6,6-hepta(p-toluenesulfonic acid)cyclohexyl, 1-methyl-1,2,3,3,4,6,6-hepta(p-toluenesulfonic acid) cyclohexyl, 1-methyl-1,2,2,3,5,5,6-hepta(p-toluenesulfonic acid)cyclohexyl, 1-methyl-1,2,2,3,4,5,5-hepta(p-toluenesulfonic acid)cyclohexyl, 1-methyl-2,2,3,4,5,5,6-hepta(p-toluenesulfonic acid)cyclohexyl, 1-methyl-1,2,2,3,4,5,6-hepta(p-toluenesulfonic acid)cyclohexyl, 1-methyl-1,2,3,3,4,5,6-hepta(p-toluenesulfonic acid)cyclohexyl, and 1-methyl-1,2,3,4,4,5,6-hepta(p-toluenesulfonic acid)cyclohexyl; octa(p-toluenesulfonic acid)cyclohexyl having a methyl group such as 1-methyl-2,2,3,3,5,5,6,6-octa(p-toluenesulfonic acid)cyclohexyl, 1-methyl-1,2,2,3,3,4,5,6-octa(p-toluenesulfonic acid)cyclohexyl, 1-methyl-1,2,3,3,4,4,5,6-octa(p-toluenesulfonic acid)cyclohexyl, 1-methyl-1,2,2,3,4,5,6,6-octa(p-toluenesulfonic acid)cyclohexyl, 1-methyl-1,2,2,3,4,4,5,6-octa(p-toluenesulfonic acid)cyclohexyl, 1-methyl-1,2,3,3,4,5,5,6-octa(p-toluenesulfonic acid)cyclohexyl, and 1-methyl-1,2,2,3,4,5,5,6-octa(p-toluenesulfonic acid)cyclohexyl; nona(p-toluenesulfonic acid)cyclohexyl having a methyl group such as 1-methyl-1,2,2,3,3,5,5,6,6-nona(p-toluenesulfonic acid)cyclohexyl, 1-methyl-2,2,3,3,4,5,5,6,6-nona(p-toluenesulfonic acid)cyclohexyl, 1-methyl-1,2,2,3,3,4,5,6,6-nona(p-toluenesulfonic acid)cyclohexyl, 1-methyl-1,2,2,3,3,4,4,5,5,6-nona(p-toluenesulfonic acid)cyclohexyl, 1-methyl-1,2,2,3,3,4,5,5,6-nona(p-toluenesulfonic acid)cyclohexyl, and 1-methyl-1,2,2,3,4,4,5,6,6-nona(p-toluenesulfonic acid) cyclohexyl; deca(p-toluenesulfonic acid) cyclohexyl having a methyl group such as 1-methyl-2,2,3,3,4,4,5,5,6,6-deca(p-toluenesulfonic acid)cyclohexyl, and 1-methyl-1,2,2,3,3,4,4,5,5,6,6-deca(p-toluenesulfonic acid)cyclohexyl; 1-methyl-1,2,2,3,3,4,4,5,5,6,6-undeca(p-toluenesulfonic acid)cyclohexyl; 1-hydroxy-1,2-bis(p-toluenesulfonic acid)cyclohexyl; 1-hydroxy-2,3-bis(p-toluenesulfonic acid)cyclohexyl; 1-hydroxy-3,4-bis(p-toluenesulfonic acid)cyclohexyl; 1-hydroxy-1,3-bis(p-toluenesulfonic acid)cyclohexyl; 1-hydroxy-2,4-bis(p-toluenesulfonic acid)cyclohexyl; 1-hydroxy-3,5-bis(p-toluenesulfonic acid)cyclohexyl; 1-hydroxy-2,6-bis(p-toluenesulfonic acid)cyclohexyl; 1-hydroxy-1,4-bis(p-toluenesulfonic acid)cyclohexyl; 1-hydroxy-2,5-bis(p-toluenesulfonic acid)cyclohexyl; 1-hydroxy-2,4,5-tris(p-toluenesulfonic acid)cyclohexyl; 1,3-dihydroxy-2,4,6-tris(p-toluenesulfonic acid)cyclohexyl; 1,3,5-trihydroxy-2,4,6-tris(p-toluenesulfonic acid)cyclohexyl; 1,4-dihydroxy-2,3,5,6-tetrakis(p-toluenesulfonic acid)cyclohexyl; 1-hydroxy-4-methyl-3,5-bis(p-toluenesulfonic acid)cyclohexyl; 1-hydroxy-4-methyl-2,3,5,6-tetrakis(p-toluenesulfonic acid) cyclohexyl; 1,4-dihydroxy-2,5-dimethyl-3,6-bis(p-toluenesulfonic acid)cyclohexyl and so on. Among them, bis(p-toluenesulfonic acid)cyclohexyl and tris(p-toluenesulfonic acid) cyclohexyl are preferable. Among them, 1,2-bis(p-toluenesulfonic acid)cyclohexyl, 1,3-bis(p-toluenesulfonic acid)cyclohexyl, 1,4-bis(p-toluenesulfonic acid)cyclohexyl and 1,3,5-tris(p-toluenesulfonic acid)cyclohexyl are most preferable.

Further, instead of a group comprising p-toluenesulfonic acid, there may be said compounds but having a group comprising: 1-naphthalenesulfonic acid, 2-naphthalenesulfonic acid, p-xylene-2-sulfonic acid, 2,4,6-trimethylbenzenesulfonic acid, 2,4,6-triisopropylbenzenesulfonic acid, 2-mesitylenesulfonic acid, 4-tert-butylbenzenesulfonic acid, 4-methoxybenzenesulfonic acid, 4-ethoxybenzenesulfonic acid, p-phenolsulfonic acid, 2-chlorobenzenesulfonic acid, 3-chlorobenzenesulfonic acid, 4-chlorobenzenesulfonic acid, 2-nitrobenzenesulfonic acid, 3-nitrobenzenesulfonic acid, 4-nitrobenzenesulfonic acid, 2-nitrosobenzenesulfonic acid, 3-nitrosobenzenesulfonic acid, 4-nitrosobenzenesulfonic acid, 2-sulfobenzenesulfonic acid, 3-sulfobenzenesulfonic acid, 4-sulfobenzenesulfonic acid, 2-carboxybenzenesulfonic acid, 3-carboxybenzenesulfonic acid, 4-carboxybenzenesulfonic acid, 2-cyanobenzenesulfonic acid, 3-cyanobenzenesulfonic acid, 4-cyanobenzenesulfonic acid, 2-aminobenzenesulfonic acid, 3-aminobenzenesulfonic acid, 4-aminobenzenesulfonic acid, 2-ammoniobenzenesulfonic acid, 3-ammoniobenzenesulfonic acid, 4-ammoniobenzenesulfonic acid, 2-trimethylammoniobenzenesulfonic acid, 3-trimethylammoniobenzenesulfonic acid, 4-trimethylammoniobenzenesulfonic acid, 2-formylbenzenesulfonic acid, 3-formylbenzenesulfonic acid, 4-formylbenzenesulfonic acid or the like.

Among them, as an alternative to a group comprising p-toluenesulfonic acid, a group comprising one of the followings is particularly preferable: 1-naphthalenesulfonic acid, 2-naphthalenesulfonic acid, p-xylene-2-sulfonic acid, 2,4,6-trimethylsulfonic acid, 2,4,6-triisopropylsulfonic acid, 2-mesitylenesulfonic acid, 4-tert-butylbenzenesulfonic acid, 4-methoxybenzenesulfonic acid, 4-ethoxybenzenesulfonic acid, 4-hydroxybenzenesulfonic acid or so on.

As the filler used in the present invention, a filler such as an organic filler and an inorganic filler may be used. As the organic filler, for example, there may be listed wood powder, plywood powder, powder of cured product of thermosetting resin, shredded pieces of cloth and so on. One or more of them may be used. As the inorganic filler, for example, there may be listed powdery filler such as glass beads, glass powder, calcium carbonate, talc, silica, aluminum hydroxide, clay and mica, fibrous filler such as glass fiber and carbon fiber, and so on. One or more of them may be used. However, the filler used in the present invention is not limited to such examples.

As for the thermosetting resin composition of the present invention, with respect to 100 parts by weight of the novolac-type phenolic resin, the minimum compounding amount of the polyacetal resin is preferably 10 parts by weight and the maximum compounding amount is preferably 30 parts by weight. When the compounding amount of the polyacetal resin is less than the minimum amount, a sufficient curing rate may not be obtained. When the compounding amount exceeds the maximum amount, a gas yield during curing increases so as to deteriorate the appearance of a cured product.

As for the curing catalyst represented by the general formula (1), with respect to 100 parts by weight of the novolac-type phenolic resin (a), the minimum compounding amount is preferably 0.5 parts by weight and the maximum compounding amount is preferably 20 parts by weight. When the compounding amount of the curing catalyst is less than the minimum amount, a sufficient curing rate may not be obtained. When the compounding amount exceeds the maximum amount, materials of containers or molds to be used in thermosetting may be limited from the viewpoint of corrosion.

As the compounding amount of the filler, with respect to 100 parts of the novolac-type phenolic resin, the polyacetal resin and the curing catalyst represented by the general formula (1), the minimum amount is preferably 30 parts by weight and the maximum amount is preferably 400 parts by weight. When the compounding amount is less than the minimum amount, mechanical strength of a molded article, which is a cured product of the thermosetting resin composition, may be insufficient. When the compounding amount exceeds the maximum amount, flowability during molding may decrease so as to cause defective filling during molding.

As for the thermosetting resin composition of the present invention, resins such as a phenolic resin comprising components other than the above-mentioned components, an epoxy resin, a cyanate resin and so on may be used as needed. Within a scope which does not affect the present invention, additives to control flowability and solidification properties such as a curing agent and a curing catalyst each comprising components other than the above-mentioned components, a thickener and so on, and further various kinds of additives used in thermosetting resins and thermosetting resin compositions such as a silane coupling agent, a colorant, a flame retardant, a release agent and so on may be used.

As for the thermosetting resin composition of the present invention, there is no particular limitation to the method of incorporating the novolac-type phenolic resin, the polyacetal resin and the curing catalyst represented by the general formula (1). For increasing the curing rate, however, it is preferable to preliminarily melt and mix the novolac-type phenolic resin and the polyacetal resin to be in a uniform state before adding and mixing the curing catalyst represented by the general formula (1) therein. The novolac-type phenolic resin and the polyacetal resin may be melted and mixed in a reaction vessel at the temperature which is higher than the melting points of the resins while stirring. They also may be melted and mixed by means of a kneader such as a pressure kneader, a roll, a cokneader, a twin screw extruder or the like.

The thermosetting resin composition of the present invention can be obtained for example in such a manner that the novolac-type phenolic resin, the polyacetal resin and the curing catalyst represented by the general formula (1) are mixed together with a filler in some cases or various kinds of additives if required by means of a conventionally known mixer and then kneaded by means of a kneader as mentioned above, followed by cooling and then pulverizing so as to obtain the thermosetting resin composition of the present invention.

The mechanism that extremely increases the curing rate of the thermosetting resin composition of the present invention is unclear. However, the reason seems to be that the rate at which the polyacetal resin is decomposed to produce formaldehyde by the catalytic action of the curing catalyst represented by the general formula (1), which functions as a decomposition accelerator of polyacetal resin, is remarkably faster than the rate at which hexamethylenetetramine, which is normally used as a curing agent of novolac-type phenolic resin, is decomposed to produce formaldehyde. Further, as for the curing reaction of the produced formaldehyde with the novolac-type phenolic resin, the curing catalyst represented by the general formula (1) also seems to have the catalytic action.

It is conventionally known that a polyacetal resin is added to a novolac-type phenolic resin. For example, adding phenolic resin to polyacetal resin as an oxidation inhibitor (e.g. Japanese Examined Patent Application Publication No. Sho. 49-42662), a biaxially oriented film with improved stability in biaxial orientation comprising polyacetal resin and novolac-type phenolic resin (e.g. Japanese Patent Application laid-open (JP-A) No. Hei. 5-98039) and a method to obtain a thermoplastic flame-retardant polyacetal resin by incorporating a novolac-type phenolic resin in a polyacetal resin (e.g. JP-A No. 2002-212385) are disclosed. Also, a strength improved phenolic resin molding compound containing a novolac-type phenolic resin, a polyacetal resin and a reinforcing material is disclosed (e.g. JP-A No. 2002-275344). However, they all improve the function of a thermosetting resin by incorporating a polyacetal resin in a novolac-type phenolic resin without making the polyacetal resin decomposed and are completely different from the thermosetting resin composition as mentioned in the present invention, which is cured by allowing formaldehyde produced by discomposing a polyacetal resin to react with a novolac-type phenolic resin.

On the other hand, a method of producing a novolac-type phenolic resin by allowing phenolic monomers to react with a polyacetal resin is disclosed (e.g. JP-A Nos. Sho. 58-180515, 2000-273132, and 2001-122937). However, they all use a polyacetal resin as a material for producing a novolac-type phenolic resin and are completely different from the present invention which obtains a thermosetting resin composition having an extremely fast curing rate by using a polyacetal resin as a curing agent of a novolac-type phenolic resin.

The thermosetting resin composition of the present invention has an extremely fast curing rate and is suitably used for various applications such as molding compounds, laminated sheets, adhesives and so on.

The thermosetting resin composition of the present invention can become a cured product by heating at 50° C. or more, preferably at 80 to 200° C.

EXAMPLES

Though the present invention will be hereinafter explained in detail by way of examples, the scope of the present invention is not restricted by these examples. Further, "part(s)" and "%" mentioned in the following examples and comparative examples denote "parts by weight" and "% by weight" respectively.

Synthesis Example 1

A mixture of 100 parts of phenol, 58 parts of 37% formalin and 1 part of oxalic acid was reacted at 100° C. for three hours. A reactant mixture thus obtained was subject to dehydration by distillation under normal pressure to be a temperature of 140° C. Further, the reactant mixture was subject to distillation under reduced pressure to be a temperature of 230° C. while gradually reducing the pressure to 0.9 kPa, followed by removing unreacted phenol, thus obtaining 92 parts of a novolac-type phenol-formaldehyde resin having a softening point of 81° C. and an electrical conductivity of aqueous extract of 280 μS/cm.

Synthesis Example 2

A mixture of 100 parts of phenol, 63 parts of 37% formalin and 0.5 part of oxalic acid was reacted at 100° C. for three hours. After adding 10 parts of methanol and 20 parts of distilled water, the mixture was mixed and left for two hours. From a reactant mixture thus obtained, supernatant water was removed. The reactant mixture was then subject to dehydration by distillation under normal pressure to be a temperature of 140° C. Further, the reactant mixture was subject to distillation under reduced pressure to be a temperature of 230° C. while gradually reducing the pressure to 0.9 kPa, followed by removing unreacted phenol, thus obtaining 90 parts of a novolac-type phenol-formaldehyde resin having a softening point of 80° C. and an electrical conductivity of aqueous extract of 8 μS/cm.

Production Example 1

100 parts of the novolac-type phenol-formaldehyde resin obtained in Synthesis example 2 and 20 parts of a copolymer-type polyacetal resin (product name: Tenac-C4520; manufactured by: Asahi Kasei Corporation) were melted and mixed at 180° C. for 30 minutes, followed by placing on a cold tray and being rapidly cooled, thus obtaining 118 parts of a molten mixture.

Production Example 2

118 parts of a molten mixture was obtained in the same manner as in the Preparation example 1 except that the novolac-type phenol-formaldehyde resin obtained in Synthesis example 2 was altered to the novolac-type phenol-formaldehyde resin obtained in Synthesis example 1.

Production Example 3

100 parts of the novolac-type phenol-formaldehyde resin obtained in Synthesis example 2 and 20 parts of a homopolymer-type polyacetal resin (product name: Delrin 500 NC010; manufactured by DuPont) were melted and mixed at 190° C. for 30 minutes, followed by placing on a cold tray and being rapidly cooled, thus obtaining 118 parts of a molten mixture.

Examples 1 to 14

Materials compounded in the ratio shown in Table 1 were each pounded and mixed in a mortar at a room temperature of 25° C. for three minutes to obtain thermosetting resin compositions. Using the thermosetting resin compositions thus obtained, evaluation of gel time, which is an indicator of the curing rate, was carried out. Gel time is measured the time required for 1 g of a sample placed on a hot plate at 110° C. or 170° C. and continually stirred with a spatula to be non-stringy even when lifting the spatula from the sample. As the time required gets shorter, the curing rate gets faster.

TABLE 1

(unit: parts by weight)

| | | Example 1 | Example 2 | Example 3 | Example 4 | Example 5 | Example 6 | Example 7 |
|---|---|---|---|---|---|---|---|---|
| Novolac-type phenolic resin of Synthesis example 2 | | | | | 100 | 100 | 100 | |
| Copolymer-type polyacetal resin (product name: Tenac-C-4520; manufactured by: Asahi Kasei Corporation) | | | | | 5 | 25 | 35 | |
| Molten mixture of Production example 1 | | | 120 | | | | | 120 |
| Molten mixture of Production example 2 | | | | 120 | | | | |
| Molten mixture of Production example 3 | | 120 | | | | | | |
| Curing catalyst | 1,2-bis(p-toluenesulfonic acid)cyclohexyl | 10 | 10 | 10 | | | | |
| | 1,4-bis(p-toluenesulfonic acid)cyclohexyl | | | | 10 | 10 | 10 | |
| | 1,3,5-tris(p-toluenesulfonic acid)cyclohexyl | | | | | | | 10 |
| | 1,2-bis(1-naphthalenesulfonic acid)cyclohexyl | | | | | | | |
| | 1,2-bis (benzenesulfonic acid)cyclohexyl | | | | | | | |
| | 1,4-bis (2-mesitylenesulfonic acid)cyclohexyl | | | | | | | |
| | 1,4-bis (4-methoxybenzenesulfonic acid)cyclohexyl | | | | | | | |
| | 1,2-bis (3-nitrobenzenesulfonic acid cyclohexyl | | | | | | | |
| | 1,2-bis (3-chlorobenzenesulfonic acid)cyclohexyl | | | | | | | |
| | 1,4-bis (4-aminobenzenesulfonic acid)cyclohexyl | | | | | | | |
| Evaluation | Gel time at 110° C. (sec.) | >6,000 | >6,000 | >6,000 | >6,000 | >6,000 | >6,000 | >6,000 |
| | Gel time at 170° C. (sec.) | 13 | 16 | 14 | 15 | 12 | 10 | 23 |

| | Example 8 | Example 9 | Example 10 | Example 11 | Example 12 | Example 13 | Example 14 |
|---|---|---|---|---|---|---|---|
| Novolac-type phenolic resin of Synthesis example 2 | | | | | | | |
| Copolymer-type polyacetal resin | | | | | | | |

TABLE 1-continued (unit: parts by weight)

| | | | | | | | | |
|---|---|---|---|---|---|---|---|---|
| (product name: Tenac-C-4520; manufactured by: Asahi Kasei Corporation) | | | | | | | | |
| Molten mixture of Production example 1 | | 120 | 120 | 120 | 120 | 120 | 120 | 120 |
| Molten mixture of Production example 2 | | | | | | | | |
| Molten mixture of Production example 3 | | | | | | | | |
| Curing catalyst | 1,2-bis(p-toluenesulfonic acid)cyclohexyl | | | | | | | |
| | 1,4-bis(p-toluenesulfonic acid)cyclohexyl | | | | | | | |
| | 1,3,5-tris(p-toluenesulfonic acid)cyclohexyl | | | | | | | |
| | 1,2-bis(1-naphthalenesulfonic acid)cyclohexyl | 10 | | | | | | |
| | 1,2-bis (benzenesulfonic acid)cyclohexyl | | 10 | | | | | |
| | 1,4-bis (2-mesitylenesulfonic acid)cyclohexyl | | | 10 | | | | |
| | 1,4-bis (4-methoxybenzenesulfonic acid)cyclohexyl | | | | 10 | | | |
| | 1,2-bis (3-nitrobenzenesulfonic acid cyclohexyl | | | | | 10 | | |
| | 1,2-bis (3-chlorobenzenesulfonic acid)cyclohexyl | | | | | | 10 | |
| | 1,4-bis (4-aminobenzenesulfonic acid)cyclohexyl | | | | | | | 10 |
| Evaluation | Gel time at 110° C. (sec.) | >6,000 | >6,000 | >6,000 | >6,000 | >6,000 | >6,000 | >6000 |
| | Gel time at 170° C. (sec.) | 18 | 17 | 20 | 16 | 18 | 16 | 20 |

Comparative Examples 1 to 3

Materials compounded in the ratio shown in Table 2 were each pounded and mixed in a mortar at a room temperature of 25° C. for three minutes to obtain thermosetting resin compositions. Using the thermosetting resin compositions thus obtained, evaluation of gel time, which is an indicator of the curing rate, was carried out in the same manner as in the Examples.

TABLE 2

Table 2

(unit:: parts by weight)

| | Comparative example 1 | Comparative example 2 | Comparative example 3 |
|---|---|---|---|
| Novolac-type phenolic resin of Synthesis example 1 | 100 | | 100 |
| Novolac-type phenolic resin of Synthesis example 2 | | 100 | |
| Hexamethylenetetramine | 20 | 20 | 20 |
| Salicylic acid | | | |
| Evaluation Gel time at 110° C. (sec.) | 1,840 | 1,858 | 1,711 |
| Gel time at 170° C. (sec.) | 46 | 55 | 38 |

Examples 15 to 18 and Comparative Examples 4 and 5

Materials compounded in the ratio shown in Table 3 were each mixed and kneaded (by batch method) 20 times at 90° C. with a heating roller (manufactured by: Sumitomo Heavy Industries, Ltd.) They were then subject to cooling and pounding, thus obtained molding compounds. Using the molding compounds thus obtained, evaluation of Barcol hardness, which is an indicator of the curing rate, was carried out. Firstly, each of the molding compounds was charged into a mold for transfer molding, which was kept at 175° C., at a pressure of 20 MPa to produce a molded product with 50 mmϕ×3 mm of thickness. Barcol hardness is represented by the curing time when Barcol hardness of the molded product became 40 or more. As the time gets shorter, the curing rate gets faster.

TABLE 3

(unit:: parts by weight)

| | Example 15 | Example 16 | Example 17 | Example 18 | Comparative Example 4 | Comparative Example 5 |
|---|---|---|---|---|---|---|
| Thermosetting resin composition of Example 2 | 115 | | | | | |

TABLE 3-continued

|  | Example 15 | Example 16 | Example 17 | Example 18 | Comparative Example 4 | Comparative Example 5 |
|---|---|---|---|---|---|---|
| | | | | | (unit:: parts by weight) | |
| Thermosetting resin composition of Example 5 | | 115 | | | | |
| Thermosetting resin composition of Example 8 | | | 115 | | | |
| Thermosetting resin composition of Example 10 | | | | 115 | | |
| Thermosetting resin composition of Comparative example 2 | | | | | 115 | |
| Thermosetting resin composition of Comparative example 3 | | | | | | 115 |
| Filler Woodpowder (*1) | 150 | 150 | 150 | 150 | 150 | 150 |
| Stearic acid (*2) | 3 | 3 | 3 | 3 | 3 | 3 |
| Carbon black (*3) | 2 | 2 | 2 | 2 | 2 | 2 |
| Barcol hardness | 22 | 16 | 23 | 23 | 55 | 32 |

(*1) manufactured by: Otomo Kasei Co., Ltd.
(*2) manufactured by: Kao Corporation
(*3) manufactured by: Mitsubishi Chemical Corporation As is clear from the results of Tables 1 to 3, it is found that the thermosetting resin composition of the present invention is stable at a temperature which is lower than the molding temperature and has an extremely fast curing rate at the time of molding; namely, the thermosetting resin composition of the present invention is excellent in both productivity and moldability.

INDUSTRIAL APPLICABILITY

Since a cured product thereof has excellent properties such as heat resistance, mechanical strength, electrical properties and so on, the thermosetting resin composition of the present invention is suitable for not only applications for which a thermosetting phenolic resin composition is conventionally used such as laminated sheets, adhesives and so on but also suitable for applications for which a thermosetting resin composition molding compound is used such as automobile parts, electromechanical parts, electric and electronic parts and so on.

The invention claimed is:
1. A thermosetting resin composition for molding compound comprising a novolac-type phenolic resin, a polyacetal resin and a curing catalyst represented by a general formula (1),

[Chemical formula 1]

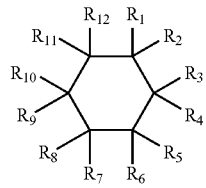

(1)

wherein, $R_1$ to $R_{12}$ each denote any of a hydrogen, an alkyl group having 1 to 4 carbon atoms, a hydroxyl group and a group represented by a formula (2) to (4), and two or more of $R_1$ to $R_{12}$ are a group represented by the formula (2), (3) or (4) and may be the same or different from each other;

[Chemical formula 2]

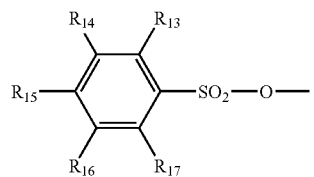

(2)

wherein, $R_{13}$ to $R_{17}$ each denote any of a hydrogen, an alkyl group having 1 to 4 carbon atoms, a hydroxyl group, an alkoxy group, a halogen, a nitro group, a nitroso group, a sulfonic group, a carboxyl group, a cyano group, an amino group, an ammonio group, a trialkylammonio group and a group represented by a formula (5) or (6);

[Chemical formula 3]

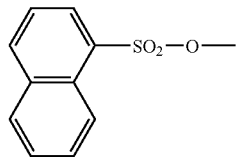

(3)

[Chemical formula 4]

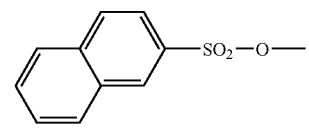

(4)

-continued

[Chemical formula 5]

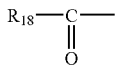 (5)

wherein $R_{18}$ denotes a hydrogen or an alkyl group having 1 to 4 carbon atoms;

[Chemical formula 6]

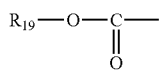 (6)

wherein $R_{19}$ denotes a hydrogen or an alkyl group having 1 to 4 carbon atoms.

2. A thermosetting resin composition for molding compound according to claim 1, wherein the curing catalyst is a compound represented by the general formula (1) having a group represented by the formula (2), (3) or (4) as $R_1$ and $R_3$, a compound represented by the general formula (1) having a group represented by the formula (2), (3) or (4) as $R_1$ and $R_5$, a compound represented by the general formula (1) having a group represented by the formula (2), (3) or (4) as $R_1$ and $R_7$, or a compound represented by the general formula (1) having a group represented by the formula (2), (3) or (4) as $R_1$, $R_5$ and $R_9$.

3. A thermosetting resin composition for molding compound according to claim 1, wherein at the 1- and 2-positions, the 1- and 3-positions, the 1- and 4-positions or the 1-, 3- and 5-positions the curing catalyst represented by the general formula (1) has one or more kinds of groups selected from the group consisting of p-toluenesulfonic acid, 1-naphthalenesulfonic acid, 2-naphthalenesulfonic acid, p-xylene-2-sulfonic acid, 2,4,6-trimethylbenzenesulfonic acid, 2,4,6-triisopropylbenzenesulfonic acid, 4-tert-butylbenzenesulfonic acid, 4-methoxybenzenesulfonic acid, 4-ethoxybenzenesulfonic acid and 4-hydroxybenzenesulfonic acid.

4. A thermosetting resin composition for molding compound according to claim 1, wherein the group represented by the formula (2) is a group represented by a formula (7).

[Chemical formula 7]

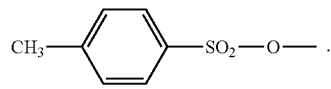 (7)

5. A thermosetting resin composition for molding compound according to claim 1, wherein the curing catalyst represented by the general formula (1) is 1,2-bis(p-toluenesulfonic acid)cyclohexyl, 1,3-bis(p-toluenesulfonic acid)cyclohexyl, 1,4-bis(p-toluenesulfonic acid)cyclohexyl or 1,3,5-tris(p-toluenesulfonic acid)cyclohexyl.

6. A thermosetting resin composition for molding compound according to claim 1, wherein the curing catalyst represented by the general formula (1) is 1,4-bis(2-mesitylenesulfonic acid)cyclohexyl.

7. A thermosetting resin composition for molding compound according to claim 1, wherein the curing catalyst represented by the general formula (1) is 1,4-bis(4-methoxybenzenesulfonic acid)cyclohexyl.

8. A thermosetting resin composition for molding compound according to claim 1, wherein the curing catalyst represented by the general formula (1) is 1,2-bis(1-naphthalenesulfonic acid)cyclohexyl.

9. A thermosetting resin composition for molding compound according to claim 1, wherein the thermosetting resin composition contains the polyacetal resin in a ratio from 10 to 30 parts by weight with respect to 100 parts by weight of the novolac-type phenolic resin.

10. A thermosetting resin composition for molding compound according to claim 1, wherein the novolac-type phenolic resin is a novolac-type phenol-formaldehyde resin obtained by reacting phenols with formaldehydes.

11. A thermosetting resin composition for molding compound according to claim 1, wherein the novolac-type phenolic resin has an electrical conductivity of aqueous extract of 50 μS/cm or less.

12. A thermosetting resin molding compound comprising a thermosetting resin composition for molding compound according to claim 1 and a filler.

13. A cured product formed by curing a thermosetting resin composition for molding compound according to claim 1.

14. A cured product formed by curing a thermosetting resin molding compound according to claim 12.

* * * * *